No. 785,681. PATENTED MAR. 21, 1905.
P. O'BRIEN.
OIL PRESS PAN.
APPLICATION FILED JULY 6, 1904.
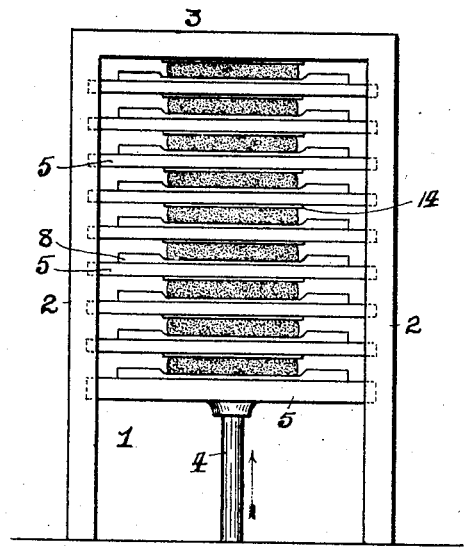
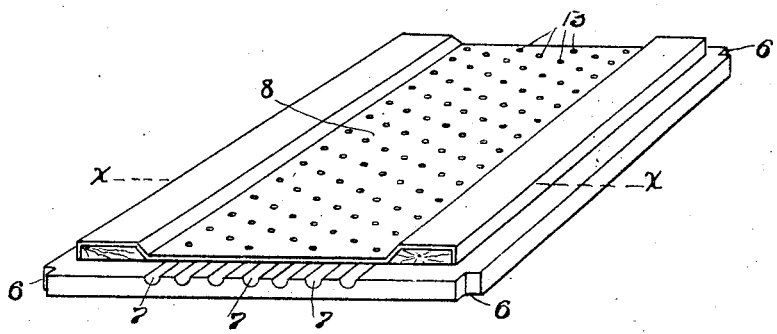
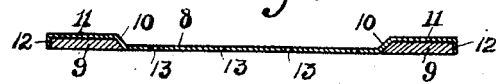
Witnesses:
George Oltsch.
Josephine Ingerto.
Patrick O'Brien
Inventor.
By Theodore Dalton
Att'y.

No. 785,681.                                    Patented March 21, 1905.

UNITED STATES PATENT OFFICE.

PATRICK O'BRIEN, OF SOUTH BEND, INDIANA.

OIL-PRESS PAN.

SPECIFICATION forming part of Letters Patent No. 785,681, dated March 21, 1905.

Application filed July 6, 1904. Serial No. 215,466.

*To all whom it may concern:*

Be it known that I, PATRICK O'BRIEN, a citizen of the United States, residing at South Bend, in the county of St. Joseph and State of Indiana, have invented certain new and useful Improvements in Means for Extracting Oil from Linseed, Cotton-Seed, or other Oil-Bearing Seeds; and I do hereby declare the following to be a full, clear, and exact description of the invention, such as will enable others skilled in the art to which it appertains to make and use the same.

This invention relates to means for extracting oil from linseed, cotton-seed, or other oil-bearing vegetables, and has for its object to improve the present process and the instrumentalities used in the performance of the same.

In the extraction of vegetable oils of the character named the seed preparatory to being pressed is ground to a fine meal and heated to the proper degree for forming meal-cakes. These meal-cakes are usually formed on an imperforate pan on which is first laid a coarsely-woven straining-cloth, known as "press-cloth," and the cake is then wrapped in the cloth. The pan and cake are then conveyed to a press and the pan withdrawn, leaving the cake supported on a plate. Considerable pressure is necessary to express the oil, inasmuch as the latter can only escape at the edges of the cake through the press-cloth. By my present invention I obviate the necessity of removing the pans on which the cakes are formed, and I may also dispense with the press-cloth and employ a larger cake by providing an improved pan and supporting-plate, the construction and merits of which will be more fully described in the following specification, which is to be considered in connection with the accompanying drawings, in which—

Figure 1 is a front elevation of a press with superposed pans, meal-cakes, and pan-supporting plates mounted therein. Fig. 2 is a perspective view of one of the pans and its supporting-plate, and Fig. 3 is a transverse section of the pan.

Making renewed reference to the drawings, wherein like characters of notation indicate corresponding parts throughout the several views, 1 designates the frame of a press, which has corner-posts 2 and a closed top 3. A piston-rod 4 is secured at its upper end to a plunger 5, which forms the lower supporting-plate for the superposed pans and cakes, each of which is supported on a similar press-plate. Each of the press-plates is notched at its corners, as at 6, and said notches engage with the edges of the upright corner-posts 2 to guide the plates and prevent displacement thereof in their vertical movement. These plates are further provided with longitudinal grooves, channels, or corrugations 7 on their upper faces to permit the expressed oil to flow to a suitable vessel, which may be arranged at either or both sides of the press. These plates are permanently mounted in the press-frame.

The pans 8, on which the meal-cakes are formed, consist of a sheet-metal plate the longitudinal edges of which are reinforced by wooden strips 9, said edges being bent upwardly, as at 10, to provide a flange 11, which is disposed above the plane of the pan proper, and the extremities of the edges are bent downwardly, as at 12, thus forming a recess in which the strips 9 are inserted. The flanged longitudinal edges of the pan provide a trough between said flanges, and this trough is provided with a plurality of apertures 13, which are spaced apart a sufficient distance to aline with the channels or corrugations 7 in the plate 5, so that the oil which passes through the perforations will run into the channels or grooves 7, and the flanges on the longitudinal edges of the pan will prevent the oil from flowing off the sides thereof.

In practice I prefer to interpose a sheet-metal plate or covering 14 between the meal-cake and the bottom of the press-plate, as shown in Fig. 1. When a series of plates, pans, and meal-cakes are arranged in a press one above the other, as shown in Fig. 1, and pressure brought to bear thereon by the upward movement of the piston-rod 4, the oil from the cake is expressed and is strained through the perforated pan and runs off through the channels or corrugations in the press-plate therebeneath.

From the above construction it will be seen that when the cake has been formed on the pan in a suitable cake-former it may be conveyed to the press and positioned upon the press-plate thereof. It will further be seen that by my invention I may dispense with wrapping the meal-cake in a press-cloth, although this is optional, and other changes may be made in the size, proportions, and minor details without departing from the principle or sacrificing any of the advantages of my invention.

Having thus described my invention, what I claim, and desire to secure by Letters Patent, is—

1. A cake pan or plate for oil-expressing presses having a perforated portion on which the cake is formed, and also having its side edges bent upwardly and outwardly to form raised sides, and a reinforcing-strip fitted under each raised side.

2. In a device of the class described, the combination with a press-frame having superposed press-plates slidably mounted therein and each provided with a grooved or corrugated upper face, of a perforated cake-pan removably positioned on each press-plate with its perforations in alinement with the grooves or corrugations of the press-plate, said pan having its side edges bent upwardly and outwardly with the extremities of such edges bent downwardly to provide recesses on the bottom of the pan at each side thereof, a reinforcing-strip positioned in said recesses, a cover-plate for the cakes, and means for compressing the cakes, substantially as specified.

In testimony whereof I affix my signature in presence of two witnesses.

PATRICK O'BRIEN.

Witnesses:
GEORGE ALTSCH,
JOSEPHINE INGERLE.